United States Patent
Kataoka

(10) Patent No.: US 11,922,971 B2
(45) Date of Patent: Mar. 5, 2024

(54) HUB, INFORMATION PROCESSING APPARATUS, AND PROGRAM

(71) Applicant: FUJIFILM CORPORATION, Tokyo (JP)

(72) Inventor: Eiichiro Kataoka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/814,838

(22) Filed: Jul. 26, 2022

(65) Prior Publication Data

US 2023/0034328 A1 Feb. 2, 2023

(30) Foreign Application Priority Data

Jul. 29, 2021 (JP) ................ 2021-124748

(51) Int. Cl.

| G11B 23/037 | (2006.01) |
| G11B 5/008 | (2006.01) |
| G11B 15/32 | (2006.01) |
| G11B 23/04 | (2006.01) |
| G11B 23/107 | (2006.01) |
| G11B 23/30 | (2006.01) |
| G06K 7/10 | (2006.01) |
| G06K 19/07 | (2006.01) |
| G11B 5/153 | (2006.01) |
| G11B 23/027 | (2006.01) |
| G11B 23/07 | (2006.01) |
| G11B 23/087 | (2006.01) |

(52) U.S. Cl.
CPC ........ *G11B 23/037* (2013.01); *G11B 5/00813* (2013.01); *G11B 15/32* (2013.01); *G11B 23/044* (2013.01); *G11B 23/046* (2013.01); *G11B 23/30* (2013.01); *G06K 7/10366* (2013.01); *G06K 19/0723* (2013.01); *G11B 5/153* (2013.01); *G11B 23/027* (2013.01); *G11B 23/07* (2013.01); *G11B 23/08728* (2013.01); *G11B 23/0875* (2013.01); *G11B 23/107* (2013.01)

(58) Field of Classification Search
None
See application file for complete search history.

(56) References Cited

U.S. PATENT DOCUMENTS

2003/0025027 A1* 2/2003 Ebisawa et al. ....... B65H 18/28
242/530.4

FOREIGN PATENT DOCUMENTS

| JP | 2004-310871 A | 11/2004 | |
| JP | 2004310871 A * | 11/2004 | ............. G11B 23/38 |
| JP | 2004355694 A * | 12/2004 | ............. G11B 15/43 |
| JP | 2005-293628 A | 10/2005 | |
| JP | 2005293628 A * | 10/2005 | ............. G11B 23/30 |
| JP | 2021-064427 A | 4/2021 | |

* cited by examiner

*Primary Examiner* — Craig A. Renner
(74) *Attorney, Agent, or Firm* — SOLARIS Intellectual Property Group, PLLC

(57) ABSTRACT

A hub includes a hub body around which a magnetic tape is wound, and a noncontact storage medium provided in the hub body, in which the noncontact storage medium stores hub specification information for specifying the hub body, and the hub specification information is associated with hub change characteristic information indicating a change characteristic of the hub body.

17 Claims, 13 Drawing Sheets

HUB, INFORMATION PROCESSING APPARATUS, AND PROGRAM

CROSS-REFERENCE TO RELATED APPLICATIONS

This application claims priority under 35 USC 119 from Japanese Patent Application No. 2021-124748 filed on Jul. 29, 2021, the disclosure of which is incorporated by reference herein.

BACKGROUND

1. Technical Field

The technology of the present disclosure relates to a hub, an information processing apparatus, and a program.

2. Related Art

JP2005-293628A discloses a reel including a hub for winding a tape, and flanges optionally provided at both ends of the hub, in which an RFID tag for executing transmission and reception of data in a noncontact manner is provided in the hub or optionally provided flanges.

JP2004-310871A discloses a management method of a magnetic recording medium. The management method of the magnetic recording medium disclosed in JP2004-310871A writes quality information of a pancake on a wireless data carrier while attaching a hub of the pancake to the wireless data carrier, and reads out the written quality information to manage the pancake based on the quality information in a predetermined process.

JP2021-064427A discloses a cartridge including a cartridge case that accommodates a magnetic tape, and a memory that is provided in the cartridge case and stores information on the magnetic tape before data recording, which is information for adjusting a width of the magnetic tape during the data recording or data reproduction of the magnetic tape.

SUMMARY

One embodiment according to the technology of the present disclosure provides a hub, an information processing apparatus, and a program that can contribute to the handling of a hub in accordance with a change characteristic of a hub body.

A first aspect according to the technology of the present disclosure relates to a hub comprising a hub body around which a magnetic tape is wound, and a noncontact storage medium provided in the hub body, in which the noncontact storage medium stores hub specification information for specifying the hub body, and the hub specification information is associated with hub change characteristic information indicating a change characteristic of the hub body.

A second aspect according to the technology of the present disclosure relates to the hub according to the first aspect, in which the hub change characteristic information includes dimensional information indicating a dimension of a deformable portion included in the hub body.

A third aspect according to the technology of the present disclosure relates to the hub according to the first or second aspect, in which the hub change characteristic information includes quality information indicating a quality of the hub body.

A fourth aspect according to the technology of the present disclosure relates to the hub according to the third aspect, in which the quality information includes expiration date information indicating an expiration date of the hub body.

A fifth aspect according to the technology of the present disclosure relates to the hub according to any one of the first to fourth aspects, in which the hub change characteristic information includes usage history information indicating a usage history of the hub body.

A sixth aspect according to the technology of the present disclosure relates to the hub according to any one of the first to fifth aspects, in which the hub change characteristic information includes hub usability information indicating usability of the hub body.

A seventh aspect according to the technology of the present disclosure relates to the hub according to the sixth aspect, in which the hub change characteristic information is changed in accordance with a command given from an outside.

An eighth aspect according to the technology of the present disclosure relates to the hub according to any one of the first to seventh aspects, in which the noncontact storage medium is embedded in the hub body.

A ninth aspect according to the technology of the present disclosure relates to the hub according to any one of the first to eighth aspects, in which the magnetic tape is a magnetic tape for a pancake.

A tenth aspect according to the technology of the present disclosure relates to an information processing apparatus comprising a processor that manages a hub including a hub body around which a magnetic tape is wound, and a noncontact storage medium provided in the hub body, in which the noncontact storage medium stores hub specification information for specifying the hub body, and the hub specification information is associated with hub change characteristic information indicating a change characteristic of the hub body, and a memory that is built in or connected to the processor, in which the processor executes processing using the hub change characteristic information.

An eleventh aspect according to the technology of the present disclosure relates to the information processing apparatus according to the tenth aspect, in which the processor changes the hub change characteristic information in accordance with a command given from an outside.

A twelfth aspect according to the technology of the present disclosure relates to the information processing apparatus according to the tenth or eleventh aspect, in which the hub change characteristic information includes first information indicating usability of the hub body, and the processor outputs information for presenting a content of the first information to a first presentation device.

A thirteenth aspect according to the technology of the present disclosure relates to the information processing apparatus according to the twelfth aspect, in which the hub change characteristic information includes second information different from the first information, and the processor determines the usability of the hub body in accordance with the second information regardless of the content of the first information, and outputs information for presenting a result of determination to a second presentation device.

A fourteenth aspect according to the technology of the present disclosure relates to the information processing apparatus according to the thirteenth aspect, in which the second information includes dimensional information indicating a dimension of a deformable portion included in the hub body.

A fifteenth aspect according to the technology of the present disclosure relates to the information processing apparatus according to the thirteenth or fourteenth aspect, in which the second information includes quality information indicating a quality of the hub body.

A sixteenth aspect according to the technology of the present disclosure relates to the information processing apparatus according to the fifteenth aspect, in which the quality information includes expiration date information indicating an expiration date of the hub body.

A seventeenth aspect according to the technology of the present disclosure relates to the information processing apparatus according to any one of the thirteenth to sixteenth aspects, in which the second information includes usage history information indicating a usage history of the hub body.

An eighteenth aspect of the technology of the present disclosure relates to the information processing apparatus according to any one of the twelfth to seventeenth aspects, in which the hub specification information is associated with equipment information for specifying equipment in which the hub body is usable, and the processor determines the usability of the hub body in accordance with the equipment information regardless of the content of the first information, and outputs information for presenting a result of determination to a third presentation device.

A nineteenth aspect of the technology of the present disclosure relates to the information processing apparatus according to any one of the twelfth to eighteenth aspects, in which the hub specification information is associated with type information indicating a type of the magnetic tape usable for the hub body, and the processor determines the usability of the hub body in accordance with the type information regardless of the content of the first information, and outputs information for presenting a result of determination to a fourth presentation device.

A twentieth aspect according to the technology of the present disclosure relates to a program causing a computer that manages a hub including a hub body around which a magnetic tape is wound, and a noncontact storage medium provided in the hub body, in which the noncontact storage medium stores hub specification information for specifying the hub body, and the hub specification information is associated with hub change characteristic information indicating a change characteristic of the hub body, to execute a process comprising executing processing using the hub change characteristic information.

BRIEF DESCRIPTION OF THE DRAWINGS

Exemplary embodiments of the present invention will be described in detail based on the following figures, wherein.

DETAILED DESCRIPTION

In the following, an example of embodiments of a hub, an information processing apparatus, and a program according to the technology of the present disclosure will be described with reference to the accompanying drawings.

First, the terms used in the following description will be described.

CPU refers to an abbreviation of "central processing unit". GPU refers to an abbreviation of "graphics processing unit". NVM refers to an abbreviation of "non-volatile memory". RAM refers to an abbreviation of "random access memory". DRAM refers to an abbreviation of "dynamic random access memory". SRAM refers to an abbreviation of "static random access memory". HDD refers to an abbreviation of "hard disk drive". SSD refers to an abbreviation of "solid state drive". ASIC refers to an abbreviation of "application specific integrated circuit". PLD refers to an abbreviation of "programmable logic device". FPGA refers to an abbreviation of "field-programmable gate array". SoC refers to an abbreviation of "system-on-a-chip". IC refers to an abbreviation of "integrated circuit". RFID refers to an abbreviation of "radio frequency identifier". EL refers to an abbreviation of "electro-luminescence". WAN refers to an abbreviation of "wide area network". LAN refers to an abbreviation of "local area network". USB refers to an abbreviation of "universal serial bus". I/F refers to an abbreviation of "interface". ID refers to an abbreviation of "identifier".

First Embodiment

Figure 1:
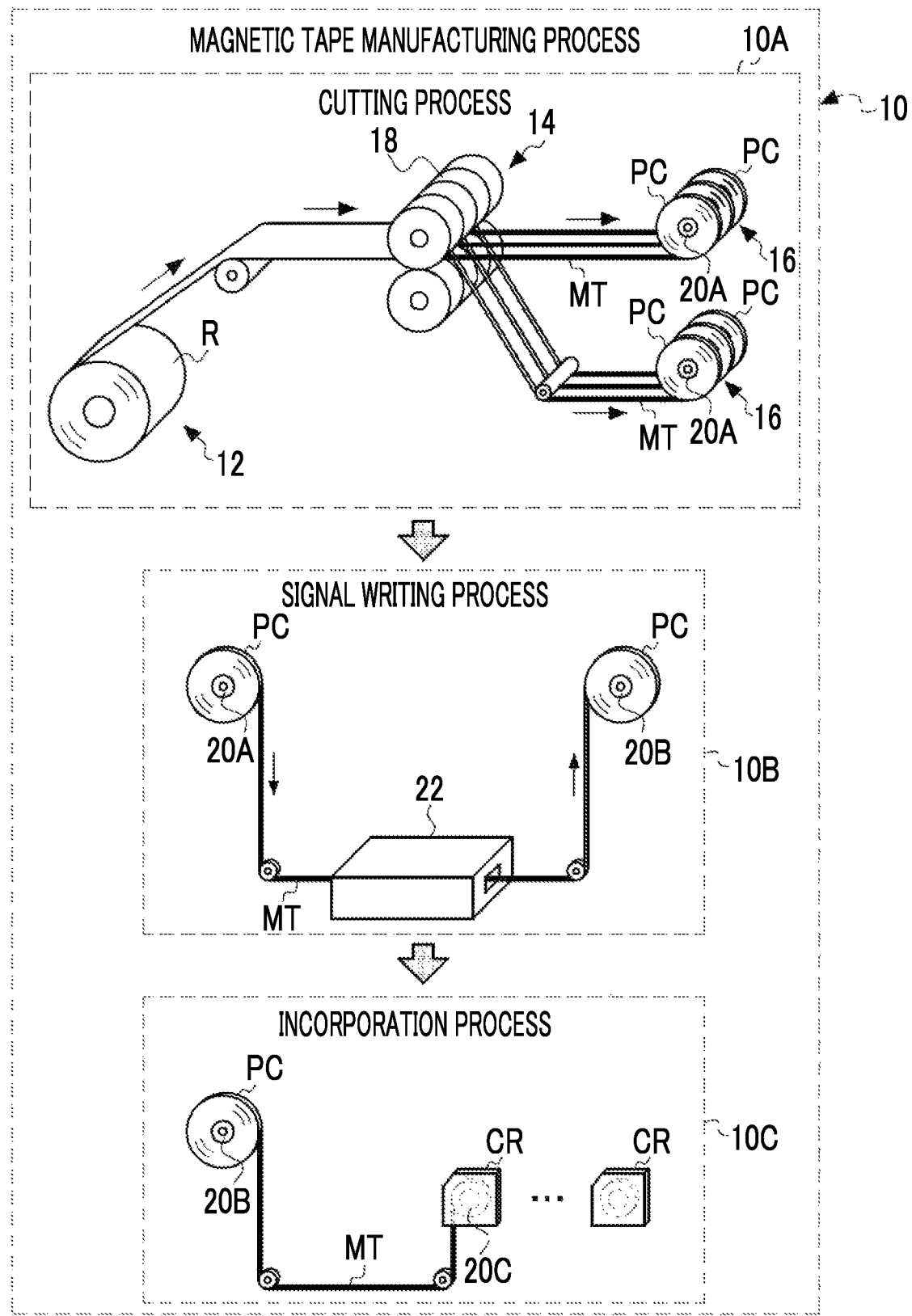
FIG. 1 is a conceptual diagram showing an example of a content of a magnetic tape manufacturing process.

As an example, as shown in FIG. 1, a magnetic tape manufacturing process 10 is a process of manufacturing a magnetic tape, and is a plurality of processes, such as a coating process (not shown), a cutting process 10A, a signal writing process 10B, and an incorporation process 10C. In the coating process of the magnetic tape, a roll is formed by applying a magnetic paint to a base film, executing alignment processing of aligning the orientations of magnetic materials of the applied magnetic paint, and then drying the magnetic paint to form a roll R.

The cutting process 10A includes an unwinding unit 12, a cutting unit 14, and a winding unit 16. The unwinding unit 12 unwinds the roll R. The cutting unit 14 cuts the roll R into a tape shape in accordance with a tape width defined by the standard by a rotating knife 18. By this cutting, the roll R becomes a plurality of magnetic tapes MT having a fixed tape width. The winding unit 16 winds each magnetic tape MT cut by the cutting unit 14 around a hub 20A to manufacture a plurality of pancakes PC. The pancake PC refers to a tape winding body obtained by winding the magnetic tape MT around the hub 20A. In the present technical field, such a tape winding body is generally referred to as a "pancake", and is used as a raw material for an intermediate process or shipped as a product.

In the signal writing process 10B, the magnetic tape MT wound around the hub 20A is wound around a hub 20B. In the signal writing process 10B, the magnetic tape MT wound around the hub 20A is drawn out and wound around the hub 20B, so that the magnetic tape MT is transferred from the hub 20A to the hub 20B. A servo writer 22 is disposed on a path in which the magnetic tape MT is transferred from the hub 20A to the hub 20B. In the signal writing process 10B, a servo signal is written on the magnetic tape MT by the servo writer 22 while the magnetic tape MT travels. That is, the servo signal is written on the magnetic tape MT by the servo writer 22 in the path in which the magnetic tape MT is transferred from the hub 20A to the hub 20B. The magnetic tape MT on which the servo signal is written is wound around the hub 20B to form the pancake PC. It should be noted that the servo signal refers to a magnetic signal for confirming that a head that reads the signal of the magnetic tape MT follows a predetermined position of the magnetic tape. In addition, the servo writer 22 executes verification of the written servo signal, in addition to the writing of the servo signal.

In the incorporation process 10C, the magnetic tape MT on which the servo signal is written in the signal writing process 10B is drawn out of the pancake PC, and is wound around a hub 20C in a cartridge CR, so that the magnetic tape MT is incorporated into the cartridge CR. As a result, the cartridge CR is completed. It should be noted that the magnetic tape MT unwound from one pancake PC is divided and incorporated into a plurality of cartridges CR. For example, 5 to 20 cartridges CR are manufactured from one pancake PC.

It should be noted that, in the following, for convenience of description, in a case in which the distinction is not required, the hubs 20A, 20B, and 20C are referred to as "hub 20".

By the way, the hub 20 is deformed, worn, or soiled by being affected by a pressure of winding of the magnetic tape MT, an external environment (temperature, humidity, and the like), and the like. Then, there is a possibility that the winding of the magnetic tape MT and the drawing of the magnetic tape MT are unstable, the magnetic tape MT is damaged, or the magnetic tape MT is soiled. In order to suppress the occurrence of such a situation, it is necessary to confirm and determine the usability of the hub 20 as accurately as possible. For that purpose, it is required to manage a dimension of the hub 20, a quality of the hub 20, the number of times of use of the hub 20, an expiration date of the hub 20, a usage history of the hub 20, and a type of the hub 20 as accurately as possible.

Figure 2:
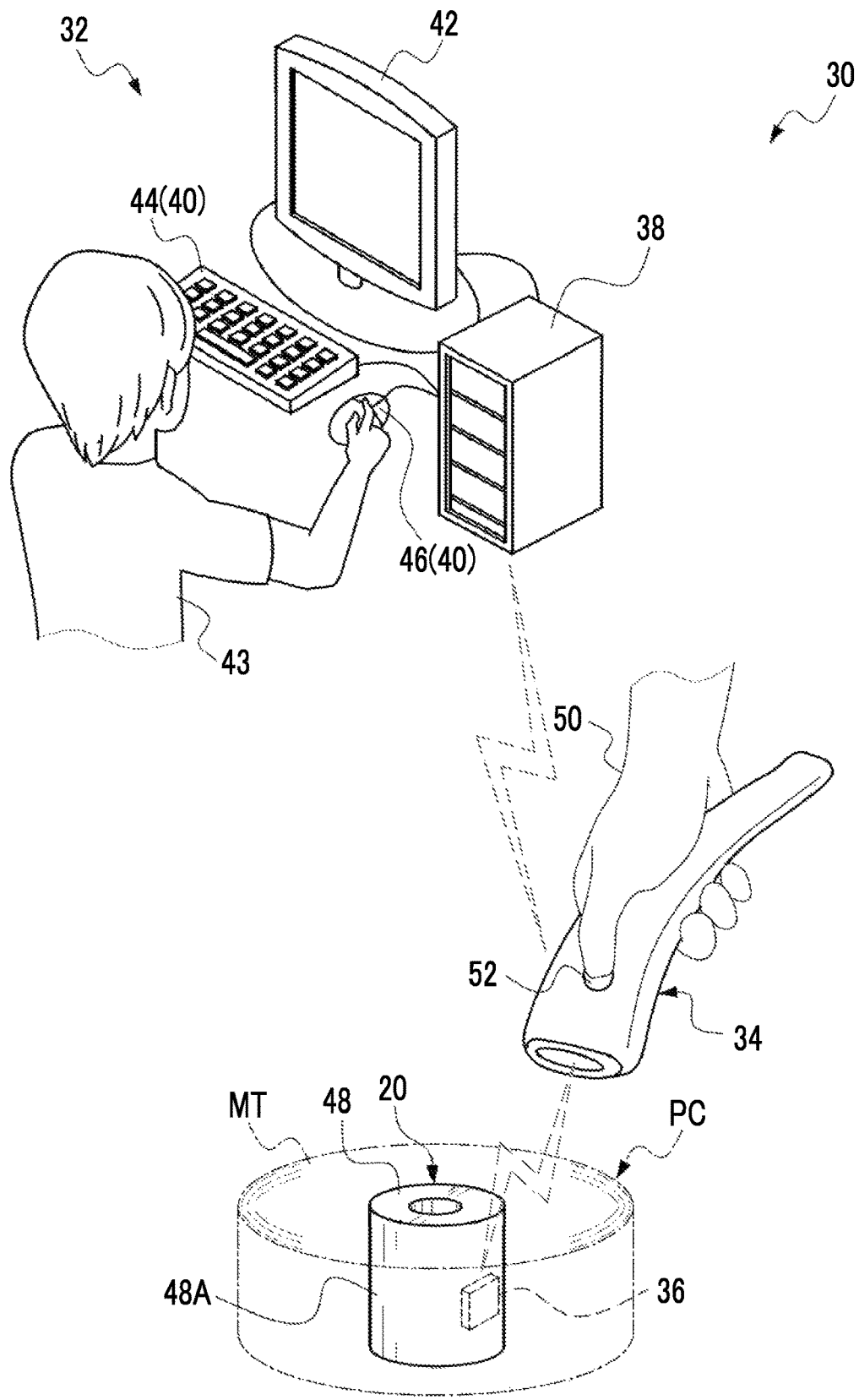
FIG. 2 is a conceptual diagram showing an example of a configuration of a hub management system.

Therefore, in the first embodiment, as shown in FIG. 2, a hub management system 30 is used as an example. The hub management system 30 comprises a management device 32, a reader/writer 34, and an RFID tag 36.

The management device 32 comprises a management device body 38, a reception device 40, and a display 42, and is used by an administrator 43.

The reception device 40 is connected to the management device body 38. The reception device 40 includes a keyboard 44, a mouse 46, and the like, and receives a command from the administrator 43. In the example shown in FIG. 2, the keyboard 44 and the mouse 46 are shown as the reception device 40, but these are merely examples, and a touch panel and/or a tablet may be used instead of the keyboard 44 and/or the mouse 46, or together with the keyboard 44 and/or the mouse 46. At least one of the keyboard 44, the mouse 46, the touch panel, or the tablet that receives proximity input, a sound input device that receives sound input, an imaging apparatus that receives gesture input, or a sensor may be used as the reception device 40. In addition, the connection between the reception device 40 and the management device body 38 may be wired or wireless.

The display 42 is connected to the management device body 38. Examples of the display 42 include an EL display and a liquid crystal display. The display 42 displays various pieces of information (for example, an image and a text) under the control of the management device body 38.

The hub 20 of the pancake PC includes a hub body 48. The magnetic tape MT for the pancake PC is wound around the hub body 48. The hub body 48 is formed in a cylindrical shape, and the magnetic tape MT is wound around an outer peripheral surface 48A of the hub body 48.

A wireless data carrier is provided in the hub body 48. The wireless data carrier is embedded in the hub body 48. As a method of embedding the wireless data carrier in the hub body 48, a method of processing the hub body 48 after forming the hub body 48 and embedding the hub body 48 may be used, or a method of embedding the hub body 48 during forming (for example, molding) may be used. It is preferable that the entire wireless data carrier be embedded in the hub body 48, but the technology of the present disclosure is established even in a case in which a part of the wireless data carrier is embedded in the hub body 48, and the technology of the present disclosure is established even in a case in which the wireless data carrier is attached to an inner peripheral surface or the outer peripheral surface of the hub body 48.

Examples of a shape of the wireless data carrier include a stick type, a label type, a card type, and a coin type. The wireless data carrier is an electromagnetic induction method carrier. It should be noted that, here, the carrier of the electromagnetic induction method is merely an example, and the carrier need only be a carrier capable of exchanging information in a noncontact manner, such as a carrier of an electromagnetic coupling method, a carrier of a microwave method, or a carrier of an optical method.

In the example shown in FIG. 2, the RFID tag 36 is shown as an example of the wireless data carrier embedded in the hub body 48. The RFID tag 36 is an example of a "noncontact storage medium" according to the technology of the present disclosure. Information on the magnetic tape MT, information on the hub body 48, and the like are written on the RFID tag 36.

The reader/writer 34 is communicably connected to the management device body 38, and various pieces of information are exchanged with the management device body 38. The reader/writer 34 is used by a worker 50. A reception device 52 is provided in the reader/writer 34. The reception device 52 is a device that receives a command from the worker 50. Examples of the reception device 52 include a button (for example, a pressing type button). The button is operated by the worker 50. In a case in which the command is received by the reception device 52, the reader/writer 34 communicates with the management device body 38 and writes the information on the RFID tag 36 in a noncontact manner, or reads out the information from the RFID tag 36 in a noncontact manner.

Figure 3:
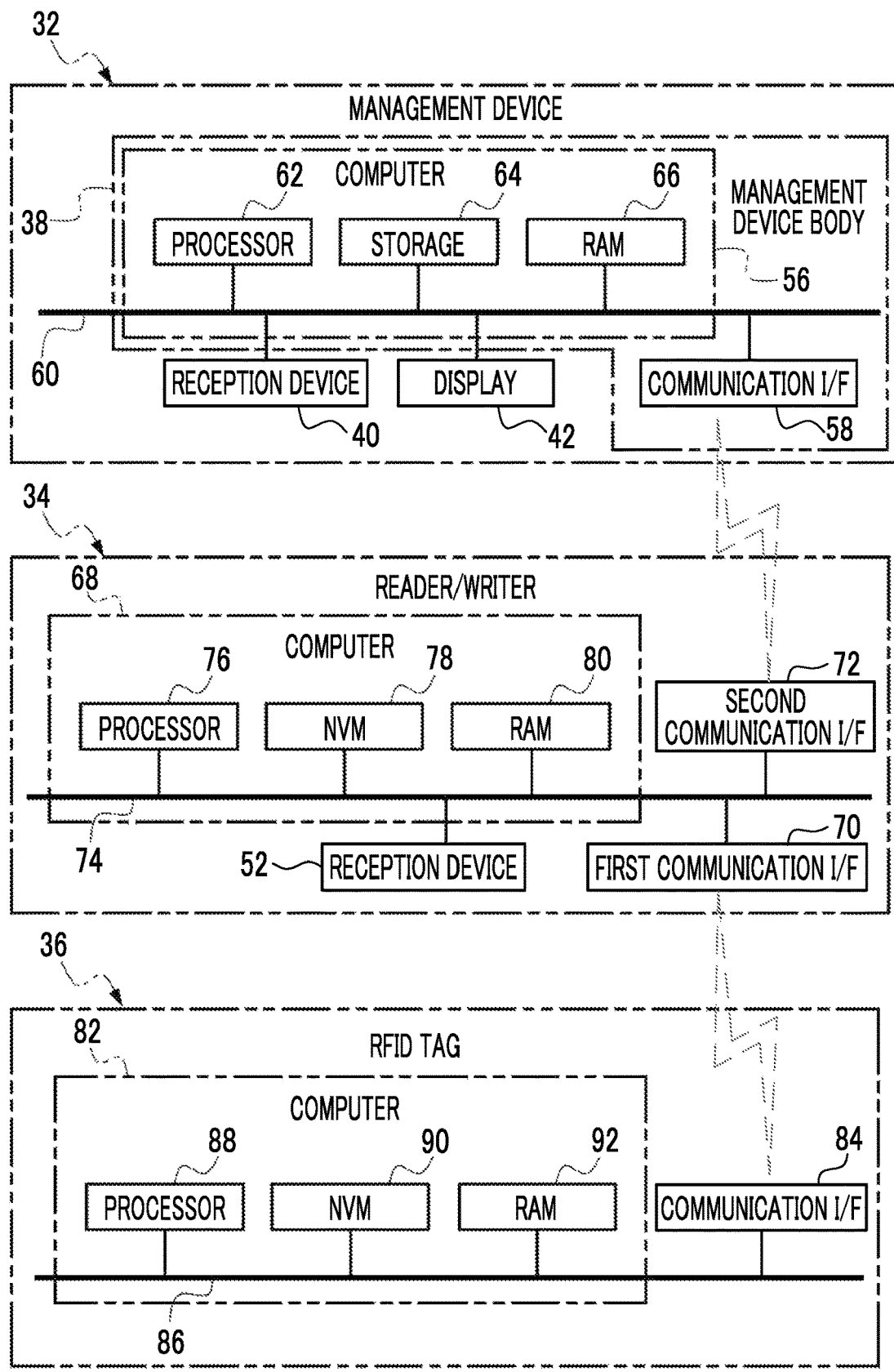
FIG. 3 is a block diagram showing an example of a configuration of an electrical system of a management device, a reader/writer, and an RFID tag.

As an example, as shown in FIG. 3, the management device body 38 comprises a computer 56, a communication I/F 58, and a bus 60. The computer 56 is an example of a "computer" according to the technology of the present disclosure, and comprises a processor 62, a storage 64, and a RAM 66. The processor 62, the storage 64, and the RAM 66 are connected to the bus 60. In addition, the communication I/F 58 is also connected to the bus 60.

The processor 62 is an example of a "processor" according to the technology of the present disclosure. The processor 62 is, for example, a CPU, and controls the entire management device 32. Here, the CPU is shown as an example of the processor 62, but this is merely an example, and the processor 62 may have the CPU and a GPU. The GPU is operated under the control of the CPU, and is responsible for executing processing relating to an image. In addition, the processor 62 may be one or more CPUs with integrated GPU functions, or may be one or more CPUs without integrated GPU functions.

A memory is connected to the processor 62. The memory is an example of a "memory" according to the technology of the present disclosure, and includes the storage 64 and the RAM 66. The storage 64 is a non-volatile storage device that stores various programs, various parameters, and the like. Examples of the storage 64 include a flash memory and an HDD. It should be noted that the flash memory and the HDD are merely examples, and for example, at least one of the flash memory, the HDD, the magnetoresistive memory, or a ferroelectric memory may be used as the storage 64.

The RAM 66 is a memory in which information is transitorily stored, and is used as a work memory by the processor 62. Examples of the RAM 66 include a DRAM and an SRAM.

The communication I/F 58 is connected to a network (not shown). The network may be composed of at least one of, for example, a LAN or a WAN. An external communication device (not shown) or the like is connected to the network, and the communication I/F 58 controls the exchange of the information with the external communication device via the network. In the example shown in FIG. 3, the reader/writer 34 is shown as an example of the external communication device. For example, the communication I/F 58 transmits the information in response to a request from the processor 62 to the reader/writer 34. In addition, the communication I/F 58 receives the information transmitted from the reader/writer 34, and outputs the received information to the processor 62 via the bus 60.

In the management device 32, the reception device 40 is connected to the bus 60. The command received by the reception device 40 is acquired by the processor 62.

In the management device 32, the display 42 is connected to the bus 60. The display 42 displays various pieces of information (for example, an image and a text) under the control of the processor 62.

The reader/writer 34 comprises a computer 68, a first communication I/F 70, a second communication I/F 72, and a bus 74, in addition to the reception device 52. The computer 68 comprises a processor 76, an NVM 78, and a RAM 80. The reception device 52, the first communication I/F 70, the second communication I/F 72, the processor 76, the NVM 78, and the RAM 80 are connected to the bus 74.

The processor 76 is, for example, a CPU, and controls the entire reader/writer 34. A memory is connected to the processor 76. The memory includes the NVM 78 and the RAM 80. Examples of the NVM 78 include the flash memory. The flash memory is merely an example, and at least one of the flash memory, the magnetoresistive memory, or the ferroelectric memory may be used as the NVM 78.

The RAM 80 is a memory in which the information is transitorily stored, and is used as a work memory by the processor 76. Examples of the RAM 80 include the DRAM and the SRAM.

The first communication I/F 70 is connected to the RFID tag 36 in a wirelessly communicable manner. The first communication I/F 70 controls the exchange of information between the processor 76 and the RFID tag 36. The processor 76 writes the information on the RFID tag 36 and reads out the information from the RFID tag 36 by transmitting and receiving the information to and from the RFID tag 36 via the first communication I/F 70. In a case in which the processor 76 writes the information on the RFID tag 36, the first communication I/F 70 transmits the information in response to a request from the processor 76 to the RFID tag 36. In addition, in a case in which the processor 76 reads out the information from the RFID tag 36, the first communication I/F 70 receives the information transmitted from the RFID tag 36 and outputs the received information to the processor 76 via the bus 74.

The second communication I/F 72 is connected to the same network as the communication I/F 58 of the management device 32. The second communication I/F 72 controls the exchange of the information with the management device 32 via the network. For example, the second communication I/F 72 receives the information transmitted from the management device 32, and outputs the received information to the processor 76 via the bus 74. In addition, the second communication I/F 72 transmits the information in response to a request from the processor 76 to the management device 32.

The RFID tag 36 comprises a computer 82, a communication I/F 84, and a bus 86. The computer 82 comprises a processor 88, an NVM 90, and a RAM 92. The communication I/F 84, the processor 88, the NVM 90, and the RAM 92 are connected to the bus 86.

The processor 88 is, for example, a CPU, and controls the entire RFID tag 36. A memory is connected to the processor 88. The memory includes the NVM 90 and the RAM 92. Examples of the NVM 90 include the ferroelectric memory. The ferroelectric memory is merely an example, and the NVM 90 need only be any non-volatile memory, such as the magnetoresistive memory.

The RAM 92 is a memory in which the information is transitorily stored, and is used as a work memory by the processor 88. Examples of the RAM 92 include the DRAM and the SRAM.

The communication I/F 84 is connected to the reader/writer 34 in a wirelessly communicable manner. The communication I/F 84 controls the exchange of information between the processor 88 and the reader/writer 34. That is, the processor 88 transmits and receives the information to and from the reader/writer 34 via the communication I/F 84.

The communication I/F 84 transmits the information in response to a request from the processor 88 to the reader/writer 34. In addition, the communication I/F 84 receives the information transmitted from the reader/writer 34, and outputs the received information to the processor 88 via the bus 86.

In the RFID tag 36, the communication I/F 84 receives a request from the reader/writer 34, and the processor 88 writes the information on the NVM 90 and reads out the information from the NVM 90 in response to the request received by the communication I/F 84.

Figure 4:
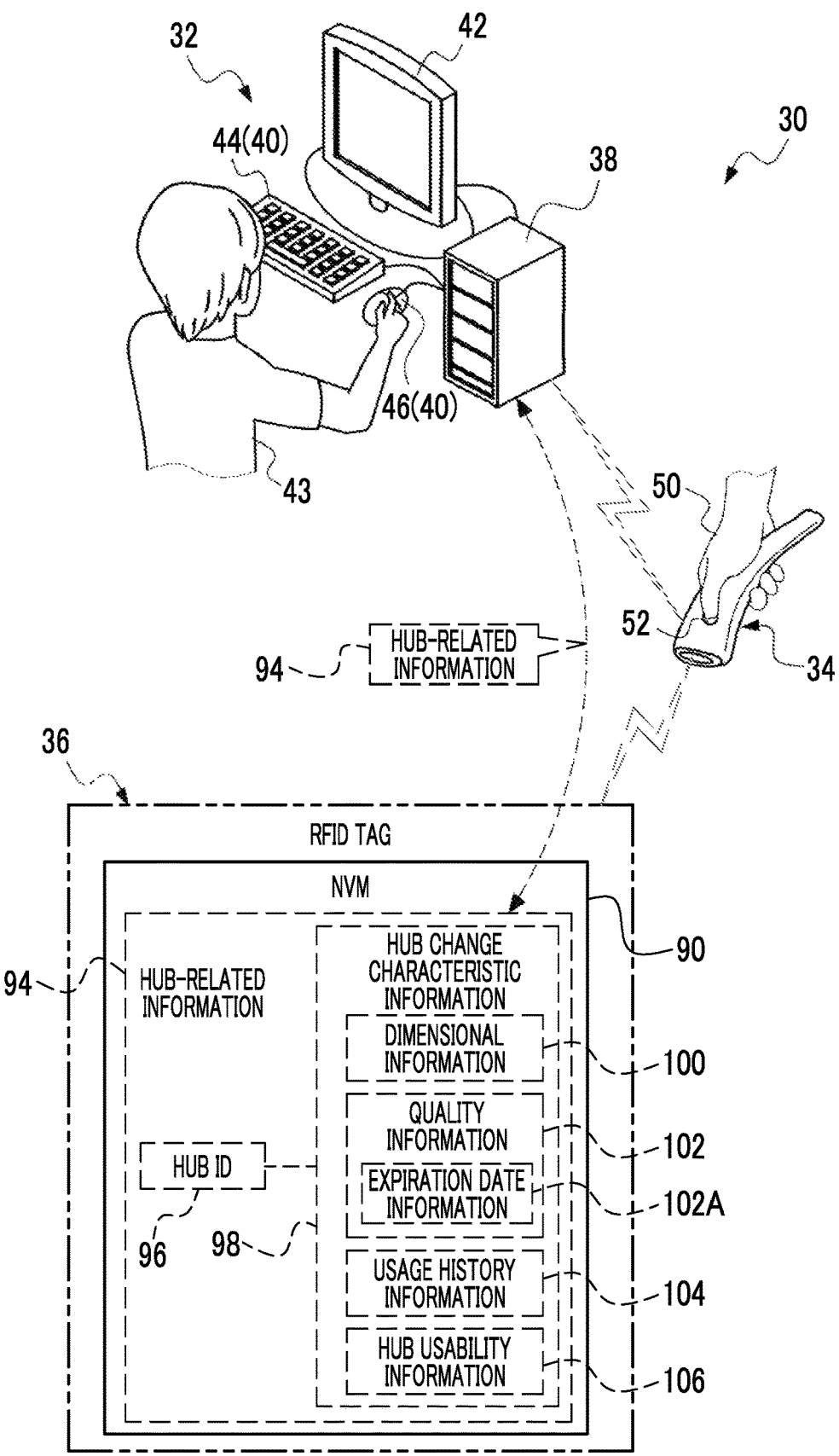
FIG. 4 is a conceptual diagram showing an example of a content of hub-related information and the handling of the hub-related information.

As an example, as shown in FIG. 4, in the RFID tag 36, hub-related information 94 is stored in the NVM 90. The hub-related information 94 includes a hub ID 96 and hub change characteristic information 98. The hub ID 96 is an example of "hub specification information" according to the technology of the present disclosure. The hub ID 96 is information for specifying the hub body 48 provided with the RFID tag 36, and is given to a plurality of hub bodies 48 as different information (that is, information for individually specifying the hub body 48).

A final content of the hub-related information 94 is determined, for example, by the administrator 43. The final content of the hub-related information 94 is received by the reception device 40 and written on the RFID tag 36 by the reader/writer 34 (that is, stored in the NVM 90).

The hub-related information 94 stored in the RFID tag 36 is read out from the RFID tag 36 by the reader/writer 34. The hub-related information 94 read out from the RFID tag 36 by the reader/writer 34 is acquired by the management device 32.

The hub change characteristic information 98 is associated with the hub ID 96. The hub change characteristic information 98 is information indicating a change characteristic of the hub body 48. Examples of the change characteristic of the hub body 48 include a characteristic to be changed, such as the dimension of the deformable portion included in the hub body 48, the quality of the hub body 48, and the usage history of the hub body 48.

The hub change characteristic information 98 includes dimensional information 100, quality information 102, usage history information 104, and hub usability information 106.

The dimensional information 100 is information indicating the dimension of the deformable portion included in the hub body 48 (for example, an outer diameter and an inner diameter of one end portion, a thickness of one end portion, an outer diameter and an inner diameter of the other end portion, a thickness of the other end portion, a thickness of a center portion, and a total length of the hub body 48 in an axial direction). The dimension of the deformable portion included in the hub body 48 is measured by, for example, the administrator 43 or the worker 50.

The quality information 102 is information indicating the quality of the hub body 48. The quality of the hub body 48 is evaluated, for example, by the administrator 43. The quality of the hub body 48 is represented by, for example, excellent (A), good (B), acceptable (C), and unacceptable (D). In addition, the quality of the hub body 48 can be expressed by the expiration date of the hub body 48 (for example, x month x day, 20xx year). In the example shown in FIG. 4, the quality information 102 includes expiration date information 102A. The expiration date information 102A is information indicating the expiration date of the hub body 48.

The usage history information 104 is information indicating the usage history of the hub body 48. The usage history refers to a history of use of the hub body 48, such as a place in which the hub body 48 is used, a period during which the hub body 48 is used, and a person who uses the hub body 48. The usage history may be managed by the administrator 43, the worker 50, or the like, or may be installed in each process (for example, the cutting process 10A, the signal writing process 10B, and the incorporation process 10C) included in the magnetic tape manufacturing process 10 and managed by various sensors or the like.

The hub usability information 106 is information indicating the usability of the hub body 48. The usability of the hub body 48 (hereinafter, also referred to as "hub usability") is determined by, for example, the administrator 43.

Figure 5:
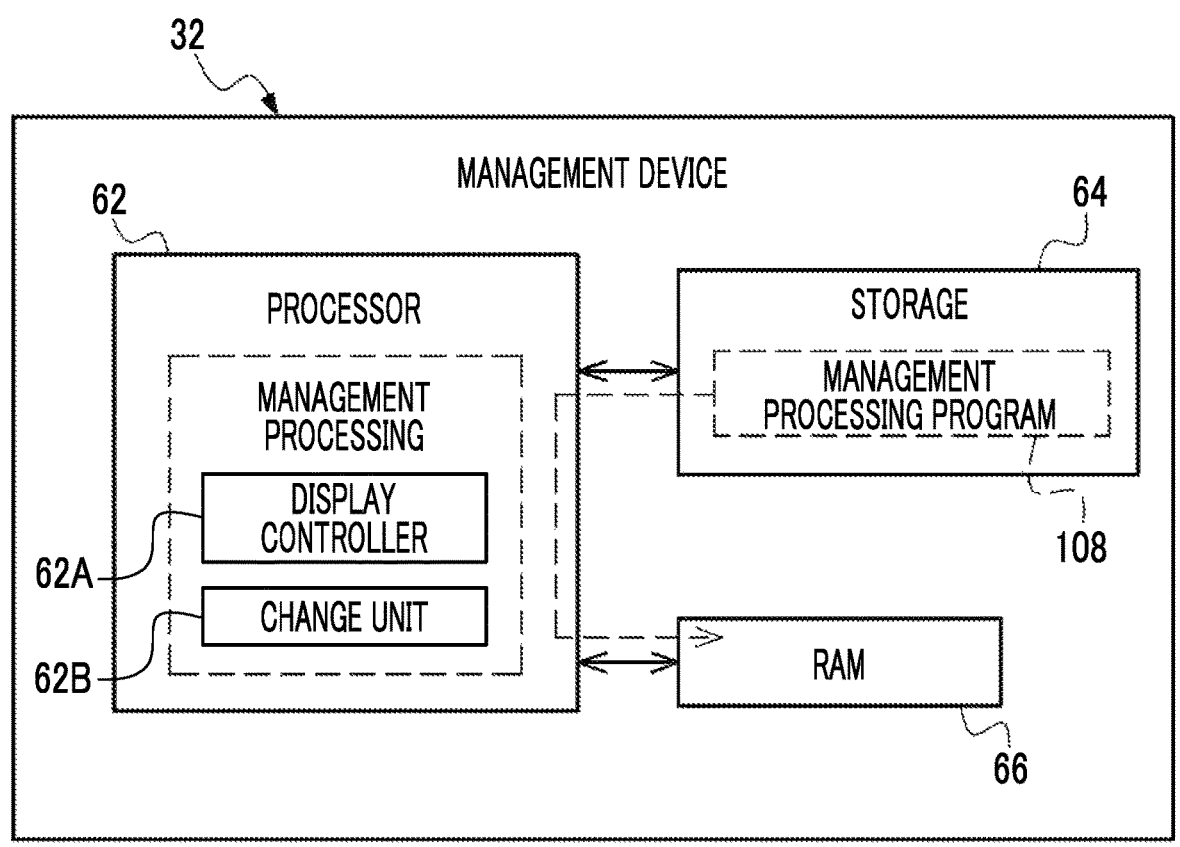
FIG. 5 is a block diagram showing an example of a main function of a processor provided in the management device according to a first embodiment.

As an example, as shown in FIG. 5, in the management device 32, the management processing is executed by the processor 62. A management processing program 108 is stored in the storage 64. The management processing program 108 is an example of a "program" according to the technology of the present disclosure. The processor 62 reads out the management processing program 108 from the storage 64 and executes the read-out management processing program 108 on the RAM 66 to execute the management processing. The management processing is realized by the processor 62 operating as a display controller 62A and a change unit 62B in accordance with the management processing program 108.

Figure 6:
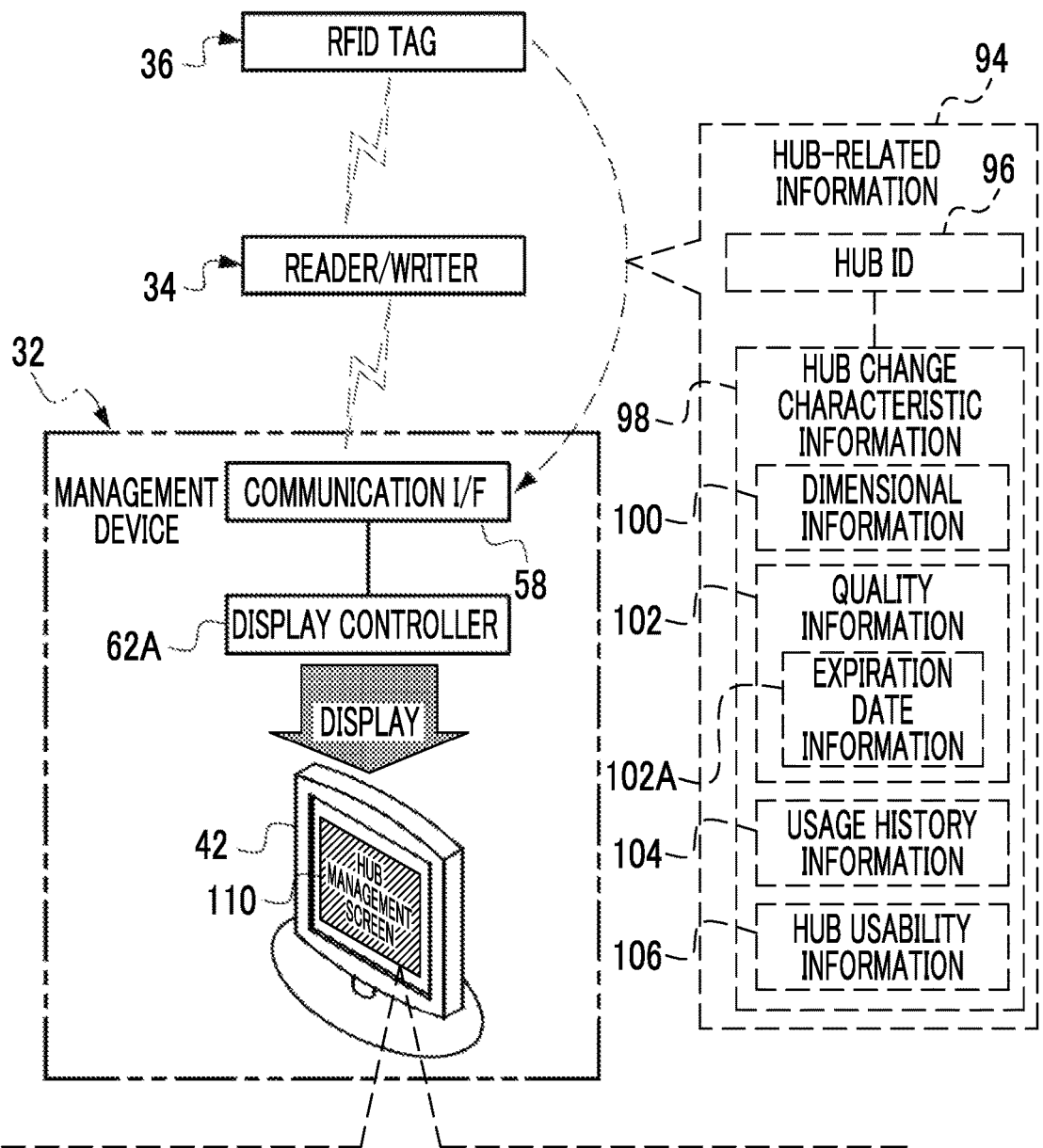
FIG. 6 is a conceptual diagram showing an example of a processing content of a display controller.

As an example, as shown in FIG. 6, the management device 32 acquires the hub-related information 94 from the RFID tag 36 via the reader/writer 34. Specifically, the reader/writer 34 reads out the hub-related information 94 from the RFID tag 36. The hub-related information 94 is transmitted to the management device 32 by the reader/writer 34. In the management device 32, the hub-related information 94 transmitted from the reader/writer 34 is received by the communication I/F 58. For example, the hub-related information 94 received by the communication I/F 58 is stored in the storage 64 (see FIGS. 3 and 5) by the processor 62 (see FIGS. 3 and 5). For example, the hub-related information 94 stored in the storage 64 is processed by the processor 62 in response to a command received by the reception device 40. An example of the processing by the processor 62 is changing the hub-related information 94.

The display controller 62A displays the hub ID 96, the dimension indicated by the dimensional information 100, the quality indicated by the quality information 102, the usage history indicated by the usage history information 104, and the hub usability indicated by the hub usability information 106 as a list, on the display 42. Specifically, the display controller 62A generates a hub management screen 110 based on the hub-related information 94 received by the communication I/F 58. Moreover, the display controller 62A displays the generated hub management screen 110 on the display 42. The hub management screen 110 includes the hub ID 96, the dimension indicated by the dimensional information 100, the quality indicated by the quality information 102, the usage history indicated by the usage history information 104, and the hub usability indicated by the hub usability information 106.

It should be noted that the display 42 is an example of a "first presentation device" according to the technology of the present disclosure. In addition, the hub usability information 106 is an example of "first information" according to the technology of the present disclosure. In addition, the hub usability indicated by the hub usability information 106 is an example of a "content of the first information" according to the technology of the present disclosure.

In the example shown in FIG. 6, the form example has been shown in which the display controller 62A outputs the information for displaying the content of the hub-related information 94 on the display 42 (in the example shown in FIG. 6, the hub management screen 110). However, the technology of the present disclosure is not limited to this. For example, the processor 62 of the management device 32 may output the information for presenting the content of the hub-related information 94 to various presentation devices. In this case, for example, instead of the display on the display 42, or together with the display on the display 42, the content of the hub-related information 94 (for example, the content of the hub ID 96 and the content of the hub change characteristic information 98 associated with the hub ID 96) may be output by sound by a sound reproducing device or recorded on a recording medium (for example, paper) by a printer.

Figure 7:
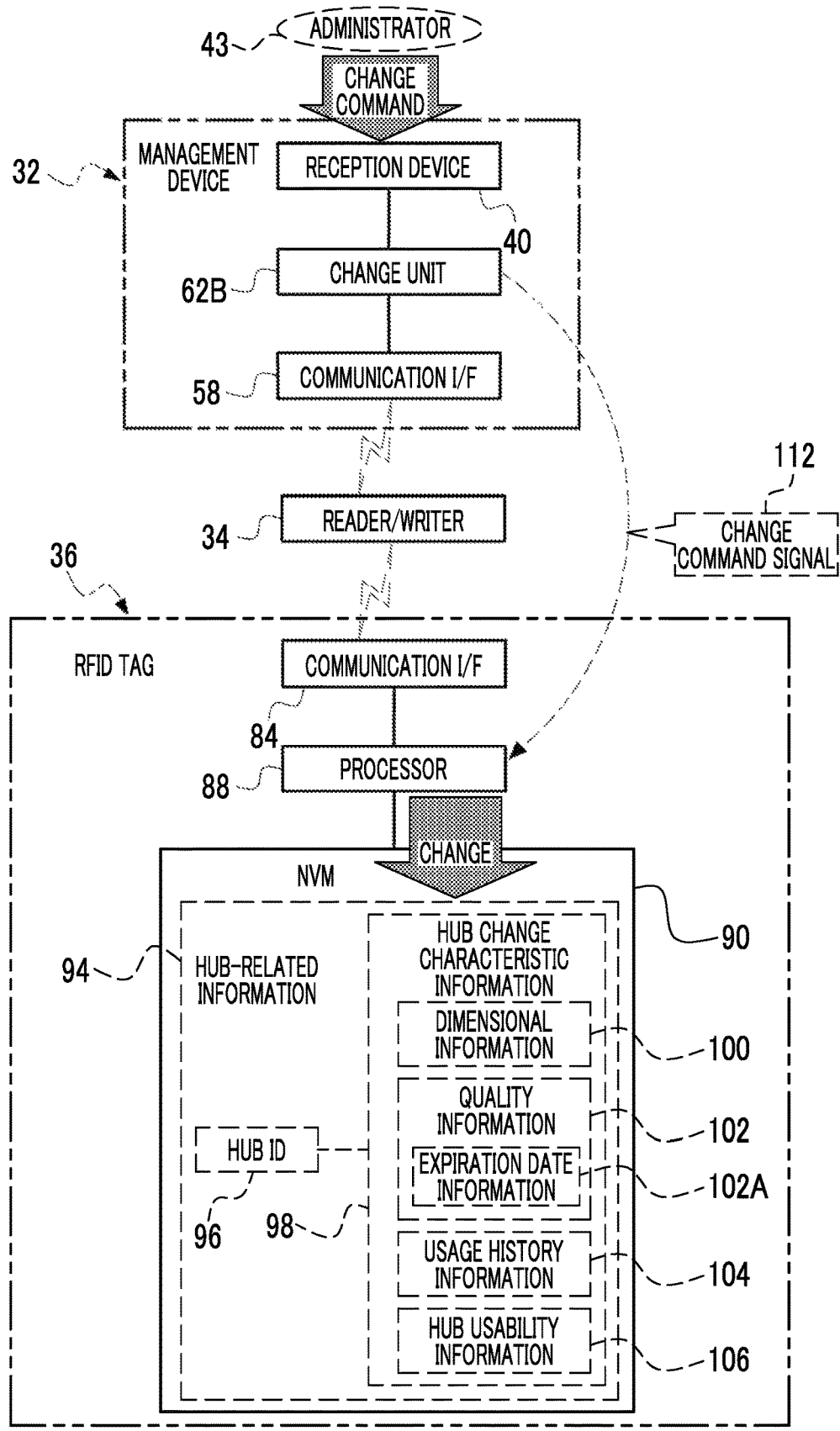
FIG. 7 is a conceptual diagram showing an example of a processing content of a change unit.

As an example, as shown in FIG. 7, the reception device 40 receives a command (hereinafter, also referred to as "change command") for changing the content of the hub change characteristic information 98 from the administrator 43. The change command includes a specific change content with respect to the hub change characteristic information 98. In a case in which the change command is received by the reception device 40, the change unit 62B generates a change command signal 112 in accordance with the change command, and transmits the generated change command signal 112 to the reader/writer 34 via the communication I/F 58. The change command signal 112 includes a signal indicating the specific content of the hub change characteristic information 98 after the change.

The reader/writer 34 receives the change command signal 112 transmitted from the management device 32, and transmits the received change command signal 112 to the RFID tag 36. In the RFID tag 36, the change command signal 112 transmitted from the reader/writer 34 is received by the communication I/F 84. The processor 88 changes the content of the hub change characteristic information 98 in response to the change command signal 112 received by the communication I/F 84. The change of the content of the hub change characteristic information 98 is, for example, at least one of the change of the content of the dimensional information 100, the change of the content of the quality information 102, the change of the content of the usage history information 104, or the change of the content of the hub usability information 106. As described above, the hub change characteristic information 98 is changed by the change unit 62B in accordance with a command given from the outside (here, as an example, the change command received by the reception device 40). It should be noted that the processing executed by the display controller 62A and the processing executed by the change unit 62B are examples of "processing using the hub change characteristic information" according to the technology of the present disclosure.

Next, an operation of the hub management system 30 according to the first embodiment will be described with reference to FIG. 8.

Figure 8:
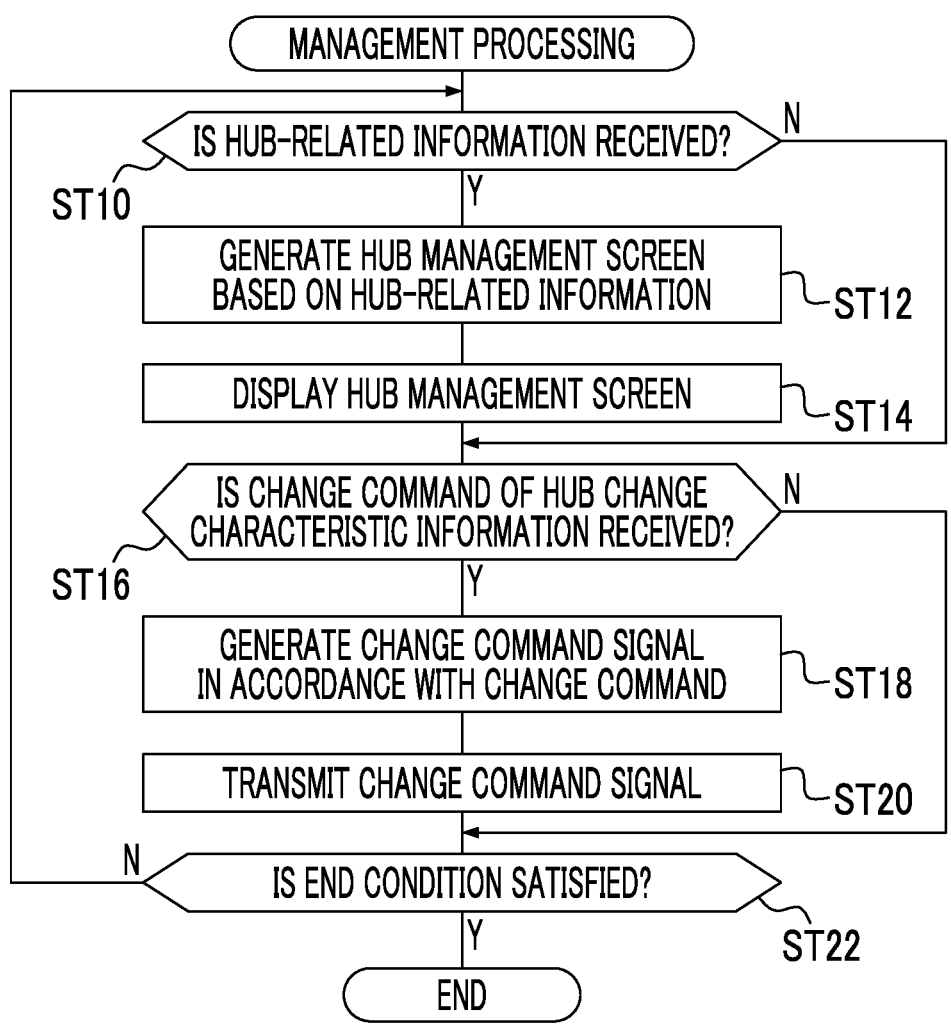
FIG. 8 is a flowchart showing an example of a flow of management processing according to the first embodiment.

FIG. 8 shows an example of the flow of management processing executed by the processor 62 of the management device 32 according to the first embodiment. It should be noted that, here, the description is made on assumption that the hub-related information 94 is stored in the RFID tag 36.

In the management processing shown in FIG. 8, first, in step ST10, the display controller 62A determines whether or not the hub-related information 94 is received by the communication I/F 58. In step ST10, in a case in which the hub-related information 94 is not received by the communication I/F 58, a negative determination is made, and the management processing proceeds to step ST16. In step ST10, in a case in which the hub-related information 94 is received by the communication I/F 58, a positive determination is made, and the management processing proceeds to step ST12.

In step ST12, the display controller 62A generates the hub management screen 110 (see FIG. 6) based on the hub-related information 94 received by the communication I/F 58 in step ST10. After processing of step ST12 is executed, the management processing proceeds to step ST14.

In step ST14, the display controller 62A displays, on the display 42, the hub management screen 110 generated in step ST12 (see FIG. 6). After processing of step ST14 is executed, the management processing proceeds to step ST16.

In step ST16, the change unit 62B determines whether or not the change command from the administrator 43 is received by the reception device 40. In step ST16, in a case in which the change command from the administrator 43 is not received by the reception device 40, a negative determination is made, and the management processing proceeds to step ST22. In step ST16, in a case in which the change command from the administrator 43 is received by the reception device 40, a positive determination is made, and the management processing proceeds to step ST18.

In step ST18, the change unit 62B generates the change command signal 112 (see FIG. 7) in accordance with the change command received by the reception device 40 in step ST16. After processing of step ST18 is executed, the management processing proceeds to step ST20.

In step ST20, the change unit 62B transmits the change command signal 112 generated in step ST18 to the RFID tag 36 via the reader/writer 34 (see FIG. 7). As a result, in the RFID tag 36, the change command signal 112 transmitted from the reader/writer 34 is received by the communication I/F 84. The processor 88 changes the content of the hub change characteristic information 98 in response to the change command signal 112 received by the communication I/F 84 (see FIG. 7). After processing of step ST20 is executed, the management processing proceeds to step ST22.

In step ST22, the processor 62 determines whether or not a condition for ending the management processing (hereinafter, referred to as "end condition") is satisfied. Examples of the end condition include a condition that a command for ending the management processing is received by the reception device 40. In a case in which the end condition is not satisfied in step ST22, a negative determination is made, and the management processing proceeds to step ST10. In a case in which the end condition is satisfied in step ST22, a positive determination is made, and the management processing ends.

As described above, in the hub management system 30, the RFID tag 36 is provided in the hub body 48 (see FIG. 2). The RFID tag 36 stores the hub-related information 94. The hub-related information 94 includes a hub ID 96 and hub change characteristic information 98. The hub change characteristic information 98 is associated with the hub ID 96. The hub body 48 is specified from the hub ID 96, and the change characteristic of the hub body 48 is specified from the hub change characteristic information 98. Therefore, it is possible to contribute to the handling of the hub 20 in accordance with the change characteristic of the hub body 48 (for example, handling of the hub 20 based on the determination, such as which hub 20 should be used for which device in which process, which hub body 48 can be used, and/or which hub body 48 cannot be used).

In addition, in the hub management system 30, the RFID tag 36 stores the hub change characteristic information 98, and the hub change characteristic information 98 includes the dimensional information 100 (see FIG. 4). The dimensional information 100 is the dimension of the deformable portion included in the hub body 48. Therefore, it is possible to contribute to the handling of the hub 20 in accordance with the dimension of the deformable portion included in the hub body 48.

In addition, in the hub management system 30, the RFID tag 36 stores the hub change characteristic information 98, and the hub change characteristic information 98 includes the quality information 102 (see FIG. 4). The quality information 102 is the information indicating the quality of the hub body 48. Therefore, it is possible to contribute to the handling of the hub 20 in accordance with the quality of the hub body 48.

In addition, in the hub management system 30, the quality information 102 includes the expiration date information 102A (see FIG. 4). The expiration date information 102A is the information indicating the expiration date of the hub body 48. Therefore, it is possible to contribute to the handling of the hub 20 in accordance with the expiration date of the hub body 48.

In addition, in the hub management system 30, the RFID tag 36 includes the usage history information 104 (see FIG. 4). The usage history information 104 is the information indicating the usage history of the hub body 48. Therefore, it is possible to contribute to the handling of the hub 20 in accordance with the usability of the hub body 48.

In addition, in the hub management system 30, the RFID tag 36 includes the hub usability information 106 (see FIG. 4). The hub usability information 106 is the information indicating the usability of the hub body 48. Therefore, it is possible to contribute to the handling of the hub 20 in accordance with the usability of the hub body 48.

In addition, in the hub management system 30, the hub change characteristic information 98 stored in the RFID tag 36 is changed in accordance with the command given by the administrator 43 (in the example shown in FIG. 7, the "change command"). Therefore, the hub change characteristic information 98 can be changed at a timing intended by the administrator 43.

In addition, in the hub management system 30, the RFID tag 36 is embedded in the hub body 48. Therefore, as compared with a case in which the entire RFID tag 36 is exposed from the hub body 48, a portion of the RFID tag 36 embedded in the hub body 48 can be protected from external stimuli (for example, impact and dust).

In addition, in the hub management system 30, the RFID tag 36 is provided in the hub body 48 around which the magnetic tape MT for the pancake PC is wound (see FIG. 2). The RFID tag 36 stores the hub-related information 94. The hub-related information 94 includes a hub ID 96 and hub change characteristic information 98. The hub change characteristic information 98 is associated with the hub ID 96. The hub body 48 is specified from the hub ID 96, and the change characteristic of the hub body 48 is specified from the hub change characteristic information 98. Therefore, it is possible to contribute to the handling of the hub 20 in accordance with the change characteristic of the hub body 48 around which the magnetic tape MT for the pancake PC is wound.

In addition, in the hub management system 30, the hub usability indicated by the hub usability information 106 is displayed on the display 42 (see FIG. 6). Therefore, it is possible to make the administrator 43 grasp the usability of the hub body 48.

In the first embodiment, the handy type reader/writer 34 (see FIG. 2) has been shown as an example, but the technology of the present disclosure is not limited to this, and a stationary type reader/writer may be used instead of the handy type reader/writer 34 or together with the handy type reader/writer 34. The stationary type reader/writer need only be installed within a range in which the wireless communication is possible with respect to a location in which the hub 20 is installed, for example.

Second Embodiment

In the first embodiment, although the form example has been shown in which the administrator 43 determines the usability of the hub body 48 with reference to the hub usability included in the hub management screen 110, in the second embodiment, a form example will be described in which the administrator 43 determines the usability of the hub body 48 without depending on the hub usability indicated by the hub usability information 106. Note that, in the second embodiment, the same components as the components in the first embodiment will be designated by the same reference numeral, the description of the components will be omitted, and the difference from the first embodiment will be mainly described.

Figure 9:
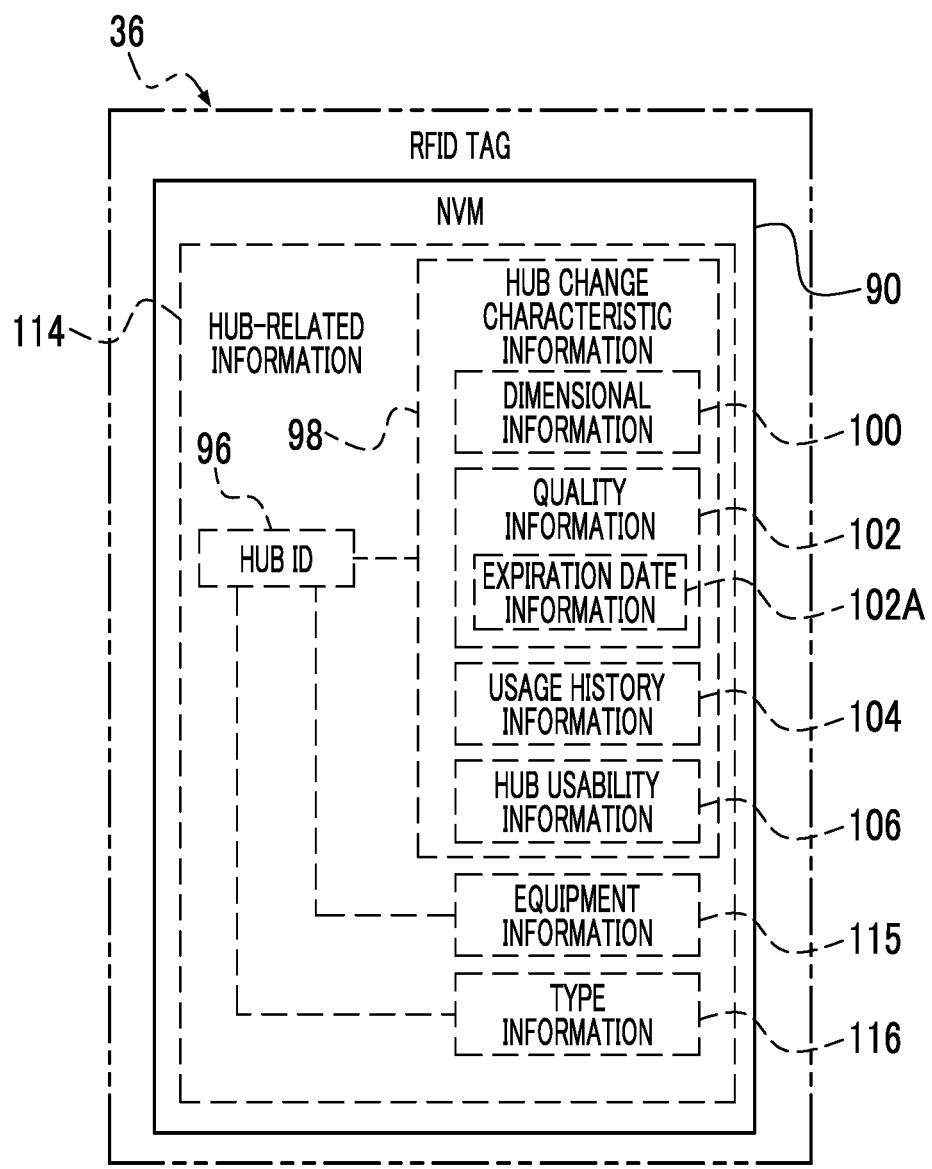
FIG. 9 is a conceptual diagram showing an example of a content of hub-related information according to a second embodiment.

As an example, as shown in FIG. 9, hub-related information 114 according to the second embodiment is different from the hub-related information 94 according to the first embodiment in that the hub-related information 114 further includes equipment information 115 and type information 116. The equipment information 115 is associated with the hub ID 96. The type information 116 is also associated with the hub ID 96.

The equipment information 115 is information for specifying the equipment in which the hub body 48 can be used. The equipment in which the hub body 48 can be used refers to, for example, equipment that is determined by the administrator 43 or the like that the hub body 48 can be used (for example, various types of equipment used in the magnetic tape manufacturing process 10). The type information 116 is information indicating a type of the magnetic tape MT that can be used for the hub body 48. The type of the magnetic tape MT that can be used for the hub body 48 refers to, for example, a type of the magnetic tape MT that is determined by the administrator 43 or the like to be usable for the hub body 48.

Figure 10:
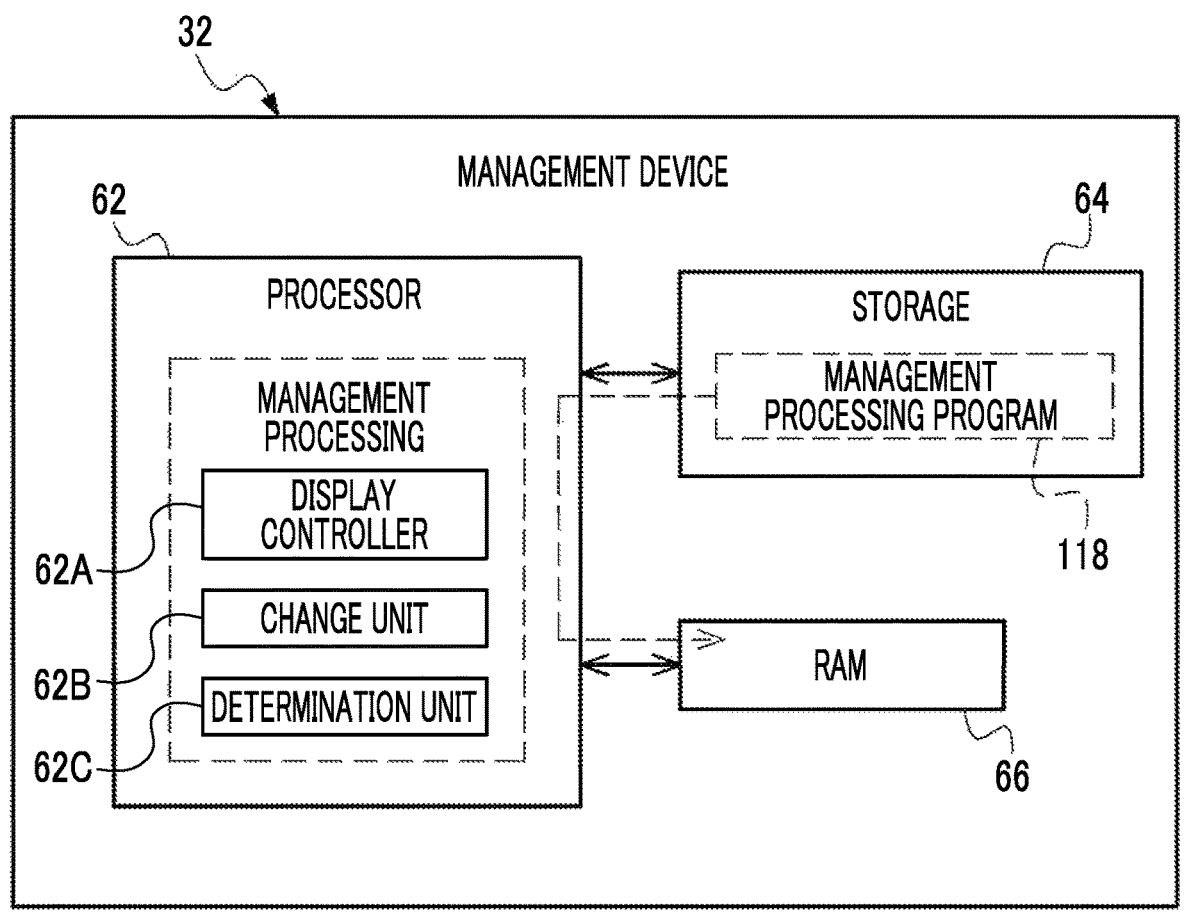
FIG. 10 is a block diagram showing an example of a main function of a processor provided in a management device according to the second embodiment.

As an example, as shown in FIG. 10, a management processing program 118 is stored in the storage 64. The management processing program 118 is an example of a "program" according to the technology of the present disclosure. The processor 62 reads out the management processing program 118 from the storage 64 and executes the read-out management processing program 118 on the RAM 66 to execute the management processing. The management processing according to the second embodiment is realized by the processor 62 operating as the display controller 62A, the change unit 62B, and a determination unit 62C in accordance with the management processing program 118.

Figure 11:
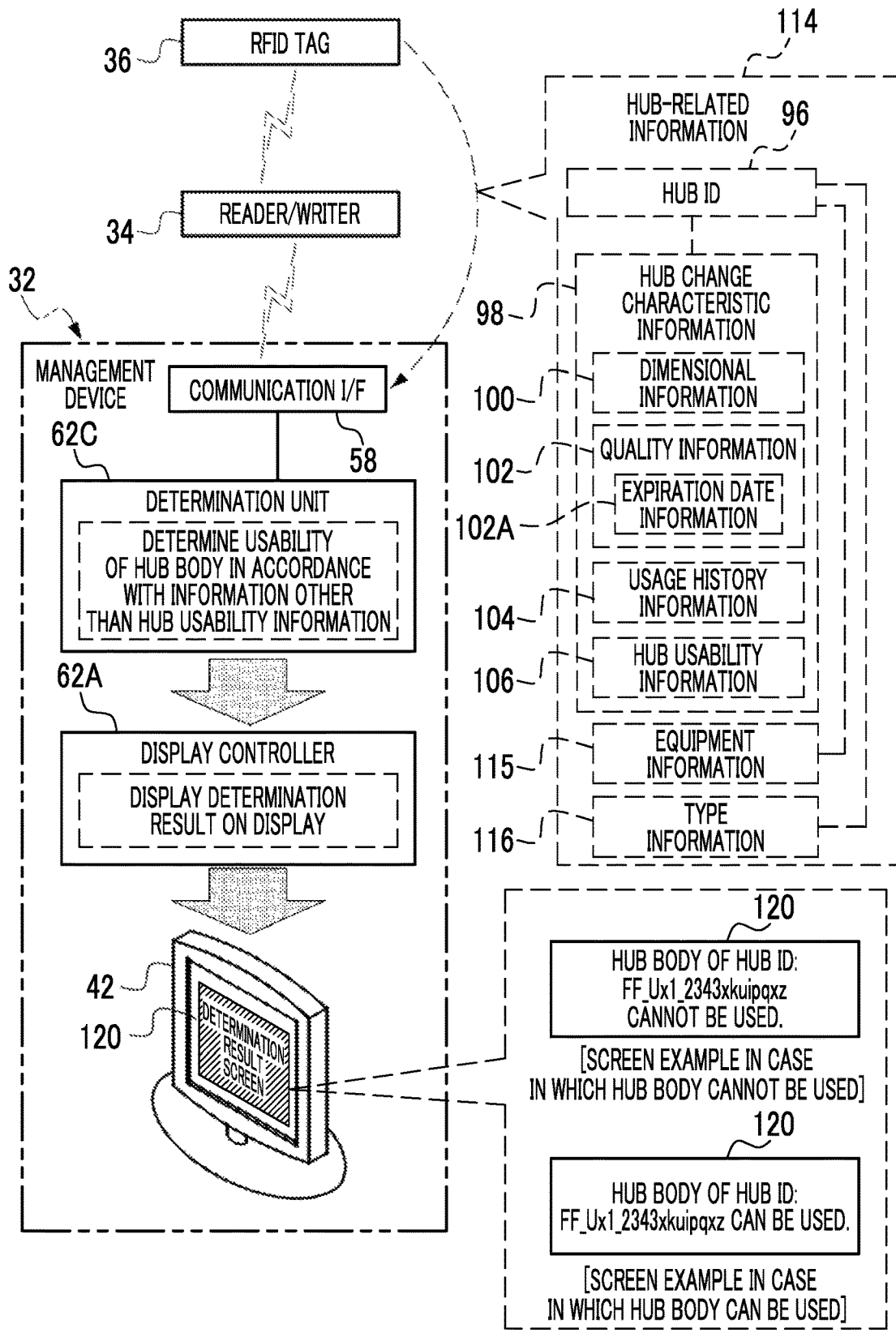
FIG. 11 is a conceptual diagram showing an example of a processing content of a determination unit and a display controller.

As an example, as shown in FIG. 11, the management device 32 acquires the hub-related information 114 from the RFID tag 36 via the reader/writer 34. Specifically, the reader/writer 34 reads out the hub-related information 114 from the RFID tag 36. The hub-related information 114 is transmitted to the management device 32 by the reader/writer 34. In the management device 32, the hub-related information 114 transmitted from the reader/writer 34 is received by the communication I/F 58. For example, the hub-related information 114 received by the communication I/F 58 is stored in the storage 64 (see FIGS. 3 and 5) by the processor 62 (see FIGS. 3 and 5). For example, the hub-related information 114 stored in the storage 64 is processed by the processor 62 in response to a command received by the reception device 40. An example of the processing by the processor 62 is changing the hub-related information 114.

In the management device 32, the determination unit 62C acquires information (that is, the dimensional information 100, the quality information 102, and the usage history information 104) other than the hub usability information 106 from the hub change characteristic information 98 included in the hub-related information 114 received by the communication I/F 58. In addition, the determination unit 62C acquires the equipment information 115 and the type information 116 from the hub-related information 114 received by the communication I/F 58.

Moreover, the determination unit 62C determines the usability of the hub body 48 in accordance with the dimensional information 100, the quality information 102, the usage history information 104, the equipment information 115, and the type information 116. For example, in a case in which at least one of the dimension indicated by the dimensional information 100, the quality indicated by the quality information 102, the usage history indicated by the usage history information 104, the equipment indicated by the equipment information 115, or the type indicated by the type information 116 fails, the determination unit 62C determines that the hub body 48 specified from the hub ID 96 cannot be used regardless of the content of the hub usability information 106. On the contrary, in a case in which all of the dimension indicated by the dimensional information 100, the quality indicated by the quality information 102, the usage history indicated by the usage history information 104, the equipment indicated by the equipment information 115, or the type indicated by the type information 116 pass, the determination unit 62C determines that the hub body 48 specified from the hub ID 96 can be used regardless of the content of the hub usability information 106.

The determination criteria for pass or fail (for example, an acceptable dimension, an acceptable quality, an acceptable usage history, acceptable equipment, and an acceptable type of the magnetic tape MT) are stored, for example, as a table or an arithmetic expression in the storage 64, and the determination unit 62C determines the pass or fail in accordance with the table or the arithmetic expression.

It should be noted that, in the second embodiment, the hub usability information 106 is an example of "first information" according to the technology of the present disclosure. In addition, the dimensional information 100, the quality information 102, and the usage history information 104 are examples of "second information" according to the technology of the present disclosure.

The display controller 62A generates a determination result screen 120 showing a result of determination by the determination unit 62C (hereinafter, also referred to as "determination result"). The display controller 62A displays the generated determination result screen 120 on the display 42. It should be noted that the display 42 is an example of a "first presentation device", a "second presentation device", a "third presentation device", and a "fourth presentation device" according to the technology of the present disclosure.

In a case in which the determination unit 62C determines that the hub body 48 cannot be used, the hub ID 96 is displayed and information (for example, a message) indicating that the hub body 48 specified from the hub ID 96 cannot be used is displayed on the determination result screen 120. In addition, in a case in which the determination unit 62C determines that the hub body 48 can be used, the hub ID 96 is displayed and information (for example, a message) indicating that the hub body 48 specified from the hub ID 96 can be used is displayed on the determination result screen 120.

In the example shown in FIG. 11, the form example has been shown in which the display controller 62A outputs the information for displaying the determination result on the display 42 (in the example shown in FIG. 11, the determination result screen 120), but the technology of the present disclosure is not limited to this. For example, the processor 62 of the management device 32 may output the information for presenting the determination result to various presentation devices. In this case, for example, instead of the display on the display 42 or together with the display on the display 42, the determination result may be output by sound by the sound reproducing device or recorded on the recording medium by the printer.

It should be noted that, in the second embodiment, the processing executed by the display controller 62A, the processing executed by the change unit 62B, and the processing executed by the determination unit 62C are the processing using "hub change characteristic information" according to the technology of the present disclosure.

Next, an operation of the hub management system 30 according to the second embodiment will be described with reference to FIG. 12.

Figure 12:
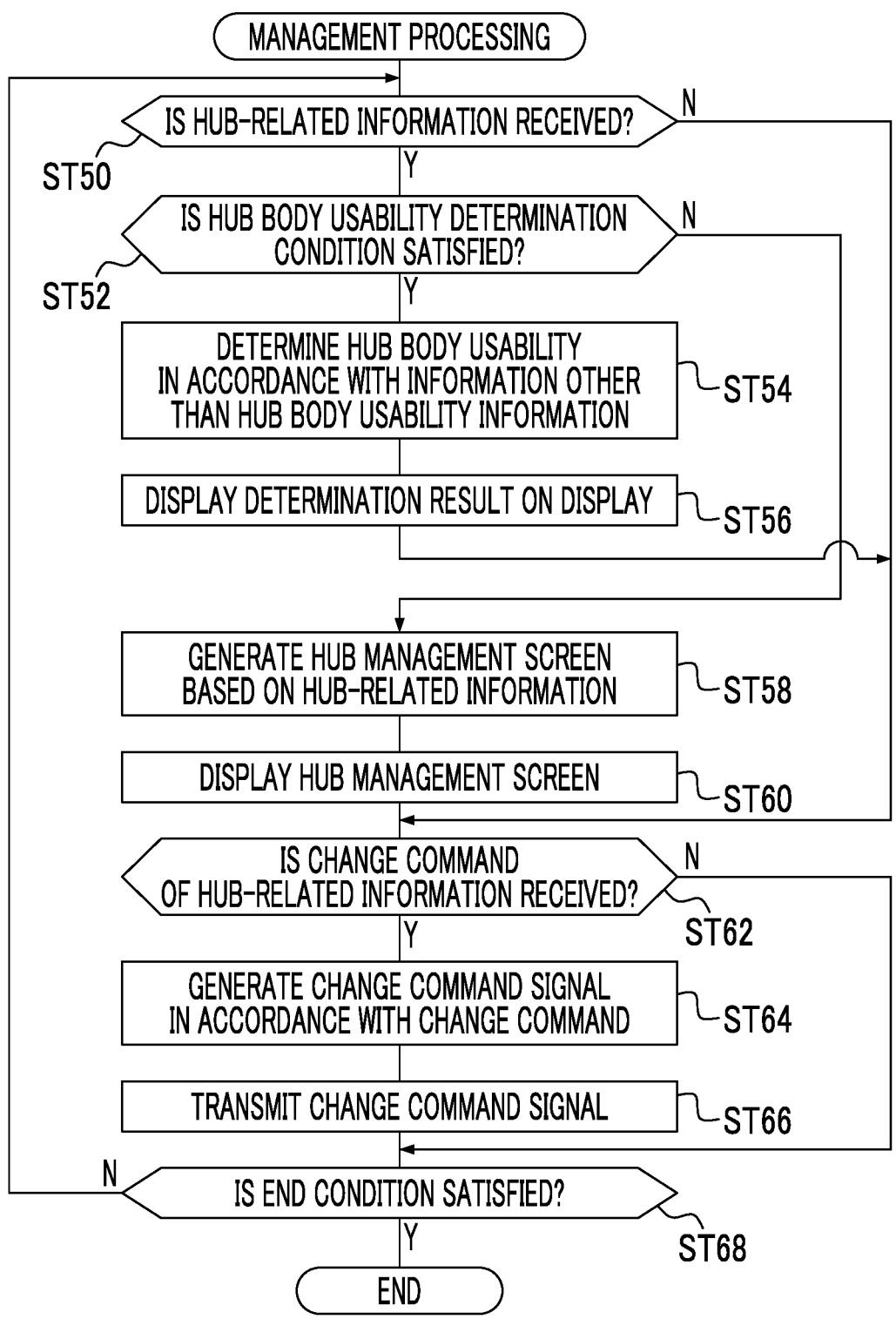
FIG. 12 is a flowchart showing an example of a flow of management processing according to the second embodiment.

FIG. 12 shows an example of the flow of management processing executed by the processor 62 of the management device 32 according to the second embodiment. It should be noted that, here, the description is made on assumption that the hub-related information 94, the equipment information 115, and the type information 116 are stored in the RFID tag 36.

In the management processing shown in FIG. 12, first, in step ST50, the determination unit 62C determines whether or not the hub-related information 114 is received by the communication I/F 58. In step ST50, in a case in which the hub-related information 114 is not received by the communication I/F 58, a negative determination is made, and the management processing proceeds to step ST62. In step ST50, in a case in which the hub-related information 114 is received by the communication I/F 58, a positive determination is made, and the management processing proceeds to step ST52.

In step ST52, the determination unit 62C determines whether or not a condition for determining the usability of the hub body 48 (hereinafter, referred to as "hub body usability determination condition") is satisfied by using the information other than the hub usability information 106 (that is, the information different from the hub usability information 106) in the information included in the hub-related information 114 received by the communication I/F 58 in step ST50. Examples of the hub body usability determination condition include a condition that a command for determining the usability of the hub body 48 is received by the reception device 40 without using the hub usability information 106 for the determination unit 62C, and a condition that a command for prohibiting the use of the hub usability information 106 by the processor 62 is received by the reception device 40.

In a case in which the hub body usability determination condition is not satisfied in step ST52, a negative determination is made, and the management processing proceeds to step ST58. In a case in which the hub body usability determination condition is satisfied in step ST52, a positive determination is made, and the management processing proceeds to step ST54.

In step ST54, the determination unit 62C determines the usability of the hub body 48 in accordance with the dimensional information 100, the quality information 102, the usage history information 104, the equipment information 115, and the type information 116 included in the hub-related information 114 received by the communication I/F 58 in step ST50 (see FIG. 11). After processing of step ST54 is executed, the management processing proceeds to step ST56.

In step ST56, the display controller 62A displays, on the display 42, the result of determination by the determination unit 62C in step ST54 (see FIG. 11). After processing of step ST56 is executed, the management processing proceeds to step ST62.

In step ST58, the display controller 62A generates the hub management screen 110 (see FIG. 6) based on the hub-related information 114 received by the communication I/F 58 in step ST50. After processing of step ST58 is executed, the management processing proceeds to step ST60.

In step ST60, the display controller 62A displays, on the display 42, the hub management screen 110 generated in step ST58 (see FIG. 6). After processing of step ST60 is executed, the management processing proceeds to step ST62.

In step ST62, the change unit 62B determines whether or not the change command from the administrator 43 is received by the reception device 40. In step ST62, in a case in which the change command from the administrator 43 is not received by the reception device 40, a negative determination is made, and the management processing proceeds to step ST68. In step ST62, in a case in which the change command from the administrator 43 is received by the reception device 40, a positive determination is made, and the management processing proceeds to step ST64.

In step ST64, the change unit 62B generates the change command signal 112 (see FIG. 7) in accordance with the change command received by the reception device 40 in step ST62. After processing of step ST64 is executed, the management processing proceeds to step ST66.

In step ST66, the change unit 62B transmits the change command signal 112 generated in step ST64 to the RFID tag 36 via the reader/writer 34 (see FIG. 7). As a result, in the RFID tag 36, the change command signal 112 transmitted from the reader/writer 34 is received by the communication I/F 84. The processor 88 changes the content of the hub change characteristic information 98 in response to the change command signal 112 received by the communication I/F 84 (see FIG. 7). After processing of step ST66 is executed, the management processing proceeds to step ST68.

In step ST68, the processor 62 determines whether or not the end condition is satisfied. In a case in which the end condition is not satisfied in step ST68, a negative determination is made, and the management processing proceeds to step ST50. In a case in which the end condition is satisfied in step ST68, a positive determination is made, and the management processing ends.

As described above, in the hub management system 30, the usability of the hub body 48 is determined in accordance with the dimensional information 100, the quality information 102, the usage history information 104, the equipment information 115, and the type information 116 included in the hub-related information 114, and the determination result is displayed on the display 42. Therefore, it is possible for the administrator 43 or the like to grasp the result of determination of the usability of the hub body 48 in accordance with the dimensional information 100, the quality information 102, the usage history information 104, the equipment information 115, and the type information 116 included in the hub-related information 114.

In addition, in the hub management system 30, the usability of the hub body 48 is determined in accordance with the dimensional information 100 included in the hub-related information 114, and the determination result is displayed on the display 42. Therefore, it is possible for the administrator 43 or the like to grasp the result of determination of the usability of the hub body 48 in accordance with the dimension of the deformable portion included in the hub body 48.

In addition, in the hub management system 30, the usability of the hub body 48 is determined in accordance with the quality information 102 included in the hub-related information 114, and the determination result is displayed on the display 42. Therefore, it is possible for the administrator 43 or the like to grasp the result of determination of the usability of the hub body 48 in accordance with the quality of the hub body 48.

In addition, in the hub management system 30, the usability of the hub body 48 is determined in accordance with the expiration date information 102A included in the quality information 102, and the determination result is displayed on the display 42. Therefore, it is possible for the administrator 43 or the like to grasp the result of determination of the usability of the hub body 48 in accordance with the expiration date of the hub body 48.

In addition, in the hub management system 30, the usability of the hub body 48 is determined in accordance with the usage history information 104 included in the hub-related information 114, and the determination result is displayed on the display 42. Therefore, it is possible for the administrator 43 or the like to grasp the result of determination of the usability of the hub body 48 in accordance with the usage history of the hub body 48.

In addition, in the hub management system 30, the usability of the hub body 48 is determined in accordance with the equipment information 115 included in the hub-related information 114, and the determination result is displayed on the display 42. Therefore, it is possible for the administrator 43 or the like to grasp the result of determination of the usability of the hub body 48 in accordance with the equipment in which the hub body 48 can be used.

In addition, in the hub management system 30, the usability of the hub body 48 is determined in accordance with the type information 116 included in the hub-related information 114, and the determination result is displayed on the display 42. Therefore, it is possible for the administrator 43 or the like to grasp the result of determination of the usability of the hub body 48 in accordance with the type of the magnetic tape MT that can be used for the hub body 48.

In the second embodiment, the form example has been shown in which the hub usability is determined by the determination unit 62C based on at least one of the dimensional information 100, the quality information 102, the usage history information 104, the equipment information 115, or the type information 116, regardless of the content of the hub usability information 106, and the determination result is displayed on the display 42, but the technology of the present disclosure is not limited to this. For example, the hub usability may be determined based on the hub usability information 106 and displayed on the display 42. In this case, for example, the determination unit 62C determines the hub usability based on at least one of the dimensional information 100, the quality information 102, the usage history information 104, the equipment information 115, or the type information 116, and the information indicating the determined hub usability is included in the hub change characteristic information 98 as the hub usability information 106. The display controller 62A displays, on the display 42, the hub usability indicated by the hub usability information 106. Here, in addition to the hub usability, as reference information, the dimension indicated by the dimensional information 100, the quality indicated by the quality information 102, the usage history indicated by the usage history information 104, the equipment indicated by the equipment information 115, and the quality of the magnetic tape MT indicated by the type information 116 may be displayed on the display 42.

In each of the embodiments described above, the form example has been shown in which the hub management screen 110 and the determination result screen 120 are displayed on the display 42 of the management device 32, but the technology of the present disclosure is not limited to this. For example, in a case in which the reader/writer 34 is provided with a display, the hub management screen 110 and/or the determination result screen 120 may be displayed on the display of the reader/writer 34. In addition, the reader/writer 34 may execute at least one processing included in the management processing.

Figure 13:
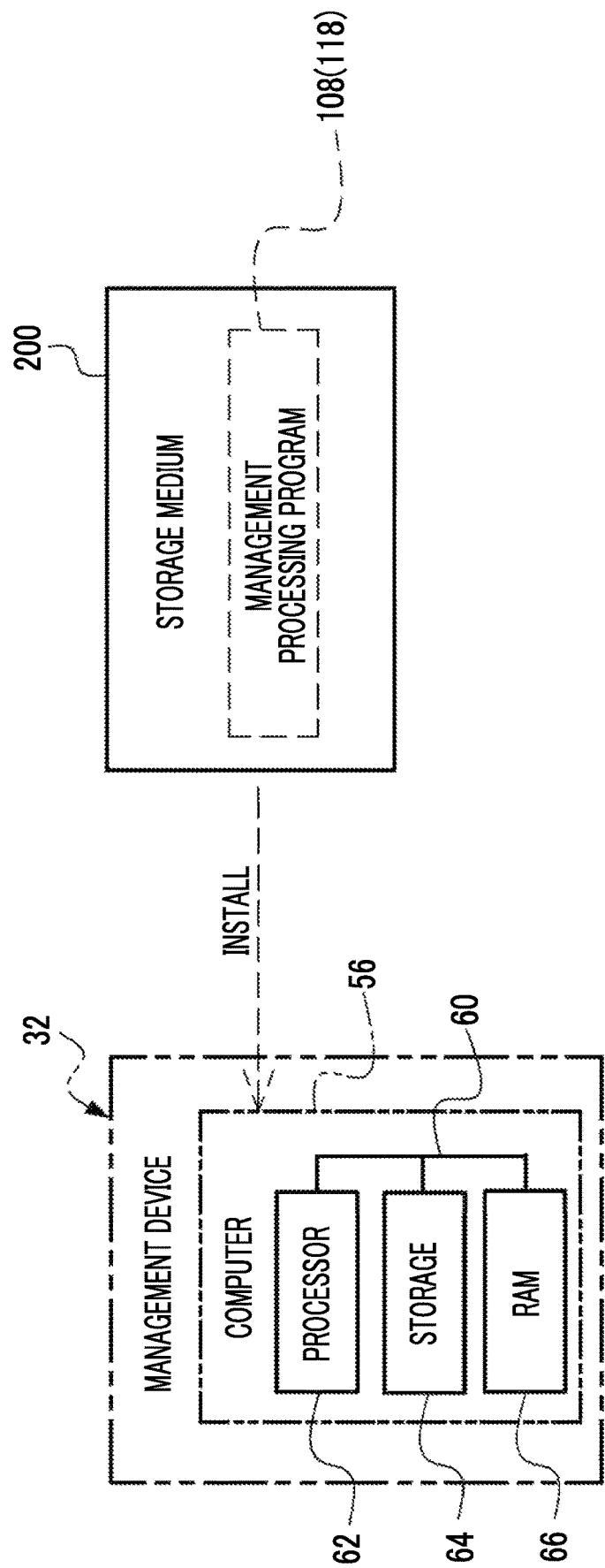
FIG. 13 is a conceptual diagram showing an example of an aspect in which a management processing program stored in a storage medium is installed in a computer of the management device.

In addition, in the embodiments described above, the form example has been shown in which the management processing program 108 (118) is stored in the storage 64, but the technology of the present disclosure is not limited to this. For example, as shown in FIG. 13, the management processing program 108 (118) may be stored in a portable storage medium 200, such as an SSD or a USB memory. The storage medium 200 is a computer-readable non-transitory storage medium. The management processing program 108 (118) stored in the storage medium 200 is installed in the computer 56 of the management device 32. The processor 62 executes the management processing in accordance with the management processing program 108 (118).

In addition, the management processing program 108 (118) may be stored in a storage device, such as another computer or server, connected to the management device 32 via a network (not shown), and the management processing program 108 (118) may be downloaded in response to a request of the management device 32 and installed in the computer 56.

It is not necessary to store the entire management processing program 108 (118) in the storage device, such as another computer or server connected to the management device 32, or the storage 64, and a part of the management processing program 108 (118) may be stored. It should be noted that the storage medium 200, the storage device, such as another computer or server connected to the management device 32, and another external storage (for example, a database) are positioned as a memory used by being directly or indirectly connected to the processor 62.

In addition, in the embodiment described above, although the computer 56 has been described as an example, the technology of the present disclosure is not limited to this, and a device including the ASIC, the FPGA, and/or the PLD may be applied instead of the computer. In addition, instead of the computer, the hardware configuration and the software configuration may be used in combination.

The following various processors can be used as the hardware resource for executing the management processing described in the above embodiments. Examples of the processor include the CPU which is a general-purpose processor functioning as the hardware resource for executing the management processing by executing software, that is, a program. In addition, examples of the processor include a dedicated electric circuit which is a processor having a circuit configuration designed to be dedicated to executing specific processing, such as the FPGA, the PLD, or the ASIC. The memory is built in or connected to any processor, and any processor executes the management processing by using the memory.

The hardware resource for executing the management processing may be composed of one of various processors, or may be composed of a combination of two or more processors of the same type or different types (for example, a combination of a plurality of FPGAs or a combination of the CPU and the FPGA). In addition, the hardware resource for executing the management processing may be one processor.

As a configuring example of one processor, first, there is a form in which one processor is composed of a combination of one or more CPUs and software and the processor functions as the hardware resource for executing the management processing. Second, as represented by the SoC or the like, there is a form of using a processor that realizes, by one IC chip, a function of the entire system including a plurality of hardware resources for executing the management processing. As described above, the management processing is realized by using one or more of the various processors as the hardware resources.

Further, as the hardware structure of these various processors, more specifically, it is possible to use an electric circuit in which circuit elements, such as semiconductor elements, are combined. In addition, the management processing is merely an example. Therefore, it is needless to say that the deletion of an unnecessary step, the addition of a new step, and the change of a processing order may be employed within a range not departing from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

What is claimed is:

1. A hub comprising:
a hub body around which a magnetic tape is wound; and
a noncontact storage medium provided in the hub body,
wherein the noncontact storage medium stores hub specification information for specifying the hub body, and
the hub specification information is associated with hub change characteristic information indicating a change characteristic of the hub body;
wherein the hub change characteristic information includes quality information indicating a quality of the hub body; and
wherein the quality information includes expiration date information indicating an expiration date of the hub body.

2. The hub according to claim 1,
wherein the hub change characteristic information includes dimensional information indicating a dimension of a deformable portion included in the hub body.

3. The hub according to claim 1,
wherein the hub change characteristic information includes usage history information indicating a usage history of the hub body.

4. The hub according to claim 1,
wherein the hub change characteristic information includes hub usability information indicating usability of the hub body.

5. The hub according to claim 4,
wherein the hub change characteristic information is changed in accordance with a command given from an outside.

6. The hub according to claim 1,
wherein the noncontact storage medium is embedded in the hub body.

7. The hub according to claim 1,
wherein the magnetic tape is a magnetic tape for a pancake.

8. An information processing apparatus comprising:
a processor that manages a hub including a hub body around which a magnetic tape is wound, and a noncontact storage medium provided in the hub body, in which the noncontact storage medium stores hub specification information for specifying the hub body, and the hub specification information is associated with hub change characteristic information indicating a change characteristic of the hub body; and
a memory that is built in or connected to the processor,
wherein the processor executes processing using the hub change characteristic information;
wherein the hub change characteristic information includes first information indicating usability of the hub body, and
the processor outputs information for presenting a content of the first information to a first presentation device.

9. The information processing apparatus according to claim 8,
wherein the processor changes the hub change characteristic information in accordance with a command given from an outside.

10. The information processing apparatus according to claim 8,
wherein the hub change characteristic information includes second information different from the first information, and
the processor
determines the usability of the hub body in accordance with the second information regardless of the content of the first information, and
outputs information for presenting a result of determination to a second presentation device.

11. The information processing apparatus according to claim 10,
wherein the second information includes dimensional information indicating a dimension of a deformable portion included in the hub body.

12. The information processing apparatus according to claim 10,
wherein the second information includes quality information indicating a quality of the hub body.

13. The information processing apparatus according to claim 12,
wherein the quality information includes expiration date information indicating an expiration date of the hub body.

14. The information processing apparatus according to claim 10,
wherein the second information includes usage history information indicating a usage history of the hub body.

15. The information processing apparatus according to claim 8,
wherein the hub specification information is associated with equipment information for specifying equipment in which the hub body is usable, and
the processor
determines the usability of the hub body in accordance with the equipment information regardless of the content of the first information, and
outputs information for presenting a result of determination to a third presentation device.

16. The information processing apparatus according to claim 8,
wherein the hub specification information is associated with type information indicating a type of the magnetic tape usable for the hub body, and
the processor
determines the usability of the hub body in accordance with the type information regardless of the content of the first information, and
outputs information for presenting a result of determination to a fourth presentation device.

17. A non-transitory computer-readable storage medium storing a program executable by a computer that manages a hub including a hub body around which a magnetic tape is wound, and a noncontact storage medium provided in the hub body, in which the noncontact storage medium stores hub specification information for specifying the hub body, and the hub specification information is associated with hub change characteristic information indicating a change characteristic of the hub body, to perform a process comprising:
executing processing using the hub change characteristic information;
wherein the hub change characteristic information includes quality information indicating a quality of the hub body; and
wherein the quality information includes expiration date information indicating an expiration date of the hub body.

* * * * *